United States Patent [19]

Bayer et al.

[11] Patent Number: 5,417,756
[45] Date of Patent: May 23, 1995

[54] PROCESS AND MOLDING COMPOUND FOR PRODUCING INORGANIC SINTERED PRODUCTS BY INJECTION MOLDING

[75] Inventors: Michael Bayer, Langweid; Peter Pyka, Nersingen; Heike Wagner, Thierhaupten, all of Germany

[73] Assignee: Hoechst Aktiengesellschaft, Germany

[21] Appl. No.: 156,441

[22] Filed: Nov. 23, 1993

[30] Foreign Application Priority Data

Nov. 25, 1992 [DE] Germany ............... 42 39 518.6

[51] Int. Cl.⁶ .................................................. C08L 91/06
[52] U.S. Cl. ................................... 106/272; 106/271; 524/277; 524/428; 524/406; 524/413
[58] Field of Search ....................... 106/270, 271, 272; 524/277, 428, 406, 413; 264/63

[56] References Cited

U.S. PATENT DOCUMENTS

| | | | |
|---|---|---|---|
| 4,906,424 | 3/1990 | Hughes et al. | 264/63 |
| 4,908,172 | 3/1990 | Sterzel et al. | 264/63 |
| 5,087,594 | 11/1992 | Kato et al. | 501/97 |
| 5,254,613 | 10/1993 | Bayer et al. | 524/277 |
| 5,258,151 | 11/1993 | Bayer et al. | 264/63 |

FOREIGN PATENT DOCUMENTS 0519326 12/1992 European Pat. Off.
3942745A1 6/1990 Germany.

OTHER PUBLICATIONS

Patent Abstracts of Japan, vol. 015, No. 202 (C-0834) Mar. 1991.

*Primary Examiner*—Mark L. Bell
*Assistant Examiner*—Michael Marcheschi
*Attorney, Agent, or Firm*—Connolly & Hutz

[57] ABSTRACT

In a ceramic or powder metallurgical molding compound which contains waxes as binder, the addition of an ethylene-vinyl acetate copolymer, an organic peroxide, an azo ester and an alcohol in combination with an extraction with a solvent leads to an improvement in the dimensional stability and the dewaxing of injection-molded shaped parts.

1 Claim, No Drawings

PROCESS AND MOLDING COMPOUND FOR PRODUCING INORGANIC SINTERED PRODUCTS BY INJECTION MOLDING

The invention relates to a ceramic or powder metallurgical molding compound which is shaped by injection molding and has been produced with the use of a chemically reacting plasticizer.

The starting material for injection-molded ceramic or powder metallurgical products is generally a fine grain powder which is encased by an organic plasticizer and then shaped by injection molding. Prior to sintering of the powder, the organic plasticizer is removed in a process known as debinding or dewaxing.

With the aid of polyolefins such as polypropylene or polyethylene in combination with paraffins, injection-molding compounds based on powder metallurgical or ceramic powder can be produced which meet the theological requirements of the injection-molding technique. The injection-molding procedure and likewise the removal from the mold can be carried out without difficulty using these compositions.

The use of polyethylene waxes in combination with ester waxes based on crude mineral wax and EVA allows, particularly in the case of ceramic powders, preparation and molding of the compounds with little metal abrasion. The injection-molding compound so produced can thus be processed in all customary automatic injection-molding machines which have hardened wear surfaces.

The use of polyethylene waxes in combination with ester waxes based on crude mineral wax in powder injection-molding compounds allows molding temperatures below 150° C. It is possible to process the molding compounds so produced by low-pressure injection molding.

It has however been shown that the dimensional stability of the components which have been produced from the injection-molding compounds described is not sufficient at temperatures above 200° C. to ensure distortion-free dewaxing, i.e. removal of the plasticizer, of the components. Rather, the moldings tend to flow under the effect of temperature, which is deleterious to the dimensional accuracy of the components.

It has furthermore been shown that dewaxing of the shaped parts requires, because of the unfavorable decomposition properties of the above-described thermoplastic, a process period of a number of days so as to obtain crack-free components, which makes the powder-injection technique, as it is also known particularly in powder metallurgy, an uneconomical process. The decomposition of the organic auxiliaries is thus determined by the influencing parameters of temperature and time.

It is known that the dewaxing step can be controlled over a wide temperature range as a function of the composition of the offgas (cf. DE 36 11 271). For this purpose, the combustion or vaporization of the plasticizer is distributed over a wide temperature range by spreading the molecular weight distribution by selection of high-molecular-weight and low-molecular-weight components.

For a similar procedure, oils, paraffins, waxes, polypropylene, polyethylene and ethylene-vinyl acetate copolymers have been proposed as plasticizer components (cf. DE 36 30 690). Here also the composition of the plasticizer has been selected with the aim of a broad molecular-weight distribution.

In accordance with the described processes it is possible to produce shaped parts by injection molding, the combustion or vaporization of the individual components occurring in the same way in each section of the shaped part as a function of temperature. This leads to the formation of vapor phases at the surface but also within the body, causing bulging of the shaped body.

Also known is the use of polyacetals which are depolymerized by an acid-containing gas atmosphere (cf. EP 455 486, EP 413 231). In this process, the organic binder is removed as formaldehyde which must subsequently be incinerated. This mode of operation requires an improvement in furnace technology in respect of protection against contamination by liberated formaldehyde.

Finally, the use of a thermally crosslinking thermoplastic system which, with the aid of azo esters, is degraded by free radicals, has also been proposed (cf. DE 41 19 997).

It has been found that an injection-molding compound which in addition to a wax also contains an ethylene-vinyl acetate copolymer, an organic peroxide, an azo ester and an alcohol can be injection-molded to give a shaped part and can be dewaxed without loss of the dimensional stability of the shaped part.

The present invention therefore provides a molding compound based on inorganic sinterable materials and comprising from 70 to 96 parts by weight of a ceramic or metal powder, from 1 to 10 parts by weight of a semisynthetic wax having a drop point of from 79° to 90° C., an acid number of from 5 to 35 mg KOH/g, a saponification number of from 70 to 160 mg KOH/g, a density of from 0.97 to 1.03 $g/cm^3$ and a viscosity at 100° C. of from 20 to 80 mPas, from 2 to 10 parts by weight of a polyolefin wax having a drop point of from 102° to 158° C., an acid number of from 0 to 64 mg KOH/g, a saponification number of from 0 to 115 mg KOH/g, a density of from 0.87 to 1.03 $g/cm^3$ and a viscosity at 170° C. of from 100 to 1500 mPas, from 1 to 10 parts by weight of an EVA copolymer having a melt index of from 0.2 to 440 dg/min, a VA proportion of from 11 to 42% and a Vicat softening temperature of from 36° to 80° C., from 0.01 to 0.05 parts by weight of an organic peroxide having a scorch temperature of greater than 100° C., from 0.01 to 0.05 parts by weight of an azo ester and from 1 to 10 parts by weight of an alcohol.

The invention also provides a process for producing ceramic and powder metallurgical shaped parts by thermoplastic molding, dewaxing and sintering, which comprises processing the abovementioned molding compound in an injection-molding machine to give a shaped part, keeping the shaped part at a temperature of from 10° to 100° C. for from 2 to 6 h in an organic solvent or in water, then heating it in an oven first for from 0.1 to 1 h at from 170° to 200° C. and then for from 1 to 10 h at from 200° to 400° C. in an oxygen atmosphere and sintering the shaped part which has been freed of binder..

The molding compound of the invention is based on non-metallic, inorganic and metallic powders. Such powders include those based on $Al_2O_3$, AlN, $Al_2TiO_5$, $B_4$, C, WC, SiC and silicates as well as recycling raw materials obtained therefrom. The powders to be used according to the invention based on metal are not oxidizable at temperatures up to 200° C. These include gas- and water-atomized stainless steel, tooled steel or noble metal powders. The maximum particle size of the non-metallic inorganic and metallic powders to be used according to the invention is 200 $\mu$m.

The molding compound also contains waxes. These waxes are natural waxes, fully synthetic or semisynthetic waxes, polyolefin waxes or amide waxes. Preferred waxes are semisynthetic waxes based on crude montan wax and polyolefin waxes.

The preferred semisynthetic wax based on crude montan wax has the following parameters:

| Drop point | from 79 to 90° C. |
|---|---|
| Acid number | from 5 to 35 mg KOH/g |
| Saponification number | from 70 to 160 mg KOH/g |
| Density | from 0.97 to 1.03 g/cm$^3$ |
| Viscosity | from 20 to 80 mPas/at 100° C. |

The preferred semisynthetic wax based on crude montan wax is obtained by oxidative bleaching of crude montan wax and esterification of the acid wax so obtained with a $C_2$ to $C_8$ diol. Waxes of this type have been commercially available for many years.

The preferred wax based on polyolefin wax has the following parameters:

| Drop point | from 102 to 158° C. |
|---|---|
| Acid number | from 0 to 64 mg KOH/g |
| Saponification number | from 0 to 115 mg KOH/g |
| Density | from 0.87 to 1.03 g/cm$^3$ |
| Viscosity | from 100 to 1500 mPas/at 170° C. |

The preferred wax based on the polyolefin wax is obtained by bulk polymerization in the low-pressure Ziegler process. These polyolefin waxes can, by treatment of the melt with air, be converted to oxidation products. These waxes also have been commercially available for many years.

In addition, the molding compound of the invention contains an ethylene-vinyl acetate copolymer which has a melt index in accordance with ASTM D 1238 of from 0.2 to 440 dg/min, preferably from 0.2 to 168 dg/min, a vinyl acetate proportion of from 11 to 42%, preferably from 11 to 28%, and a Vicat softening temperature in accordance with ASTM D 790 of from 36° to 80° C. preferably from 74° to 79° C. Ethylene-vinyl acetate copolymers are commercially available and are used for increasing toughness, flexibility and elasticity in plastics, waxes and melt adhesives.

The molding compound of the invention also contains an organic peroxide which has a scorch temperature of at least 100° C. This includes 1,1-di(t-butylperoxy)trimethylcyclohexane, n-butyl-4,4-di(t-butylperoxy)-valerate, dicumyl peroxide, t-butyl cumyl peroxide, 1,3-di(t-butylperoxyisopropyl)benzene and 3,3,6,6,9,9-hexamethyl1,2,4,5-tetraoxacyclononane, 2,5-dimethyl-2,5-di(t-butylperoxy)hexane. Organic peroxides are commercially available and are used, inter alia, for crosslinking thermoplastics and elastomers or for the thermal degradation of polybutylene or polyvinyl chloride. Preference is given to 2,5-dimethyl-2,5-di(t-butylperoxy)hexane.

The molding compound of the invention further contains an alcohol which has a molecular weight of from 300 to 35,000, preferably from 1000 to 20,000, and is either solid or liquid. It is soluble in water, ethanol, isopropanol or acetone up to a concentration of at least 40% and can be thermally removed from the shaped part without leaving a residue. The viscosity of the 50% strength solution in water is from 10 to 14,000 mPa.s at 20° C., preferably from 100 to 2000 mPa.s. The density of the alcohol is from 0.981 to 1.20 g/cm$^3$, preferably from 1.00 to 1.10 g/cm$^3$. The alcohol to be used according to the invention is insoluble in the other components of the molding compound and is produced by polymerization of alkylene oxides. Primary, secondary or tertiary monofunctional, difunctional or trifunctional alcohols can also be used in the molding compound of the invention. The boiling point of the alcohol to be used according to the invention is above 150° C., preferably from 180° to 220° C. Alcohols to be used according to the invention are commercially available and are used in the food industry, the paper industry and the adhesives industry.

Finally, the molding compound of the invention contains a free-radical former which is an azo ester, preferably 2,2-azobis (2-acetoxypropane).

The molding compound has the composition below:

| Ceramic or metal powder | from 70 to 96, preferably from 80 to 96, parts by weight, |
|---|---|
| semisynthetic wax | from 1 to 10, preferably from 1.5 to 6, parts by weight, |
| polyolefin wax | from 2 to 10, preferably from 3 to 6, parts by weight, |
| EVA copolymer | from 1 to 10, preferably from 1.5 to 3, parts by weight, |
| organic peroxide | from 0.01 to 0.05, preferably from 0.02 to 0.04, parts by weight, |
| azo ester | from 0.01 to 0.05, preferably from 0.02 to 0.04, parts by weight, |
| alcohol | from 1 to 10, preferably from 1.5 to 6, parts by weight. |

The preparation and processing of the molding compound of the invention is carried out in the following manner:

To prepare the binder component to be used according to the invention, the semisynthetic wax based on crude montan wax and the polyolefin wax are melted at a temperature of from 110° to 160° C., preferably about 150° C., in a suitable stirred vessel and processed to a homogeneous melt. While stirring, the ethylene-vinyl acetate copolymer and the alcohol are then added to the melt. The mixture is stirred at about 150° C. until all the components are completely dissolved in the melt. Finally the organic peroxide and the azo ester are carefully added while stirring. The mixture is then cooled.

To prepare the injection-molding compound the organic binder is melted in a heatable kneading machine. The metallic or ceramic powder is kneaded into the melt in the kneading machine at a temperature of about 150° C. The thermoplastic kneaded compound is comminuted to form a free-flowing granulated material, preferably by extrusion, and converted into a shaped part in an injection-molding machine.

In the cooled state the demolded shaped part has good strength, which ensures damage-free deflashing and machinability.

The binder is removed in two stages.

The shaped part obtained by injection molding is kept for from 2 to 6 h in a solvent or water at a temperature of about 50° C. This leaches the alcohol component from the shaped part. The completeness of the dewaxing can be monitored by means of a dye dissolved in the alcohol.

The shaped part is then firstly heated to from 170° to 200° C., preferably from 180° to 190° C. at a heating rate of 20 K/min in an oven and maintained at this temperature for from 0.1 to 1 hour. This increases the viscosity of the organic binder by free-radical crosslinking of the EVA component as a result of the cleavage of the organic peroxide to such an extent that deformation of the molding as a result of a reduction in viscosity, caused by a further temperature increase, does not occur. This measure enables the shape of the shaped part to be maintained over the whole duration of the subsequent dewaxing and sintering process.

The removal of the binder components still remaining in the shaped part is carried out in the second stage in the temperature range from 200° to 400° C. in an oxygen-enriched atmosphere. At a temperature above 220° C. the wax components, in particular those containing polypropylene, are degraded by free radicals as a result of the cleavage of the organic peroxide. In the absence of oxygen, which is the case inside the shaped part despite the oxygen-containing gas atmosphere outside the shaped part, the components of the binder which contain polymerized ethylene (i.e. including the EVA copolymer) are degraded by free radicals after cleavage of the azo ester in a temperature range of between 300° and 350° C. The degradation products can be easily oxidized by the oxygen-enriched oven atmosphere from the outer region of the shaped part to the inside. This is supported by the pore system obtained by wet extraction which allows gas flow within the shaped part. After the dewaxing is complete, depending on the powder raw material, the oven atmosphere is changed to protective gas.

Only after carrying out this step can the dewaxed shaped part be brought to sintering temperature.

In accordance with this process an injection-molded shaped part having a wall thickness of from 6 to 10 mm is dewaxed over a period of 10 h without distortion and sintered.

The example below is intended to illustrate the invention:

EXAMPLE 1

0.6 part by weight of ester wax based on crude montan wax (DP from 79° to 85° C.; AN from 15 to 20; SN from 130 to 160; density from 1.01 to 1.03 g/cm$^3$; viscosity about 30 mPa.s/100° C.) were melted together with 1.2 parts by weight of polyolefin wax (DP 158° C.; AN 0; SN 0; density from 0.87 to 0.89 g/cm$^3$; viscosity 1500 mPa.s/170° C.), 1.2 parts by weight of an ethylene-vinyl acetate copolymer (melt index from 0.2 to 0.4 dg/min; VA proportion from 11 to 13%; Vicat softening temperature 79° C.) and 3 parts by weight of an alcohol (molecular weight 20,000 g/mol; viscosity 13,000 mPa.s at 20° C.; density 1.1 g/cm$^3$) at 150° C. in a stirred vessel and processed to a homogeneous melt.

0.02 Part by weight each of 2,2-azobis(2-acetoxypropane) and an organic peroxide (scorch temperature about 160° C.) were stirred into this melt. 94 Parts by weight of a gas-atomized stainless steel powder having a particle size below 50 μm were then kneaded into the polymer melt at 150° C.

The thermoplastic molding compound was then converted by injection molding (compound temperature 150° C.) into test bars having a diameter of 8 mm and a length of from 50 to 60 mm.

The test bars were subsequently kept for 5 hours in acetone at a temperature of about 50° C. This leached about 40% by weight of the binder component from the shaped part. The partly dewaxed shaped parts were brought from room temperature to 600° C. at a heating rate of 5 K/min in nitrogen. During this process, the remaining binder component was thermally crosslinked in the temperature range of from 170° to 180° C., so as to prevent deformation of the shaped parts as a result of softening. Above 200° C. the remaining binder component was thermally removed by free-radical degradation. Subsequently the parts were sintered at 1250° C.

EXAMPLE 2

1.8 parts by weight of ester wax based on crude montan wax (DP from 79° to 85° C.; AN from 15° to 20; density from 1.01 to 1.03 g/cm$^3$; viscosity about 30 mPa.s/100° C.) were melted together with 4 parts by weight of polyolefin wax (DP from 120° to 125° C.; AN from 15 to 17; SN from 20 to 35; density from 0.97 to 0.99 g/cm$^3$; viscosity 4000mPa.s at 140° C.), 4 parts by weight of an ethylene-vinyl acetate copolymer (melt index from 38 to 48 dg/min; VA proportion from 32 to 34%; Vicat softening temperature 36° C.) and 9 parts by weight of an alcohol (molecular weight 2600 g/mol; viscosity of the 50% strength aqueous solution at 20° C. 1400 mPa.s; density 1.00 g/cm$^3$) at 150° C. in a stirred vessel and processed to a homogeneous melt. 0.02 Part by weight of 2,2-azobis(2-acetoxypropane) and 0.1 part by weight of an organic peroxide (scorch temperature 140° C.) were first stirred into this melt and then 0.01 part by weight of a water- and acetone-soluble dye were stirred in.

80 Parts by weight of a ground porcelain having a particle size of less than 100 μm were then kneaded into the polymer melt at 150° C.

The thermoplastic molding compound was then molded at 150° C. by injection molding to give a cup with handles.

The shaped part was subsequently kept for 4 hours in water at 70° C. the dewaxing being monitored by the discoloration of the aqueous solution caused by the dye contained in the molding compound. 45% of the polymer component in the molding compound were extracted. The partly dewaxed shaped part was brought from room temperature to 600° C. at a heating rate of 5 K/min in air. During this process, the remaining binder component was thermally crosslinked in the temperature range of from 170° to 180° C., so as to prevent deformation of the shaped part as a result of softening. Above 200° C. the remaining binder component was thermally removed by free-radical degradation. Subsequently the dewaxed cup molding was fired at 1200° C.

What is claimed is:

1. A molding compound based on inorganic sinterable materials and comprising
   from 70 to 96 parts by weight of a ceramic or metal powder,
   from 1 to 10 parts by weight of a semisynthetic wax having a drop point of from 79° to 90° C., an acid number of from 5 to 35 mg KOH/g, a saponification number of from 70 to 160 mg KOH/g, a density of from 0.97 to 1.03 g/cm$^3$ and a viscosity at 100° C. of from 20 to 80 mPas, from 2 to 10 parts by weight of a polyolefin wax having a drop point of from 102° to 158° C., an acid number of from 0 to 64 mg KOH/g, a saponification number of from 0 to 115 mg KOH/g, a density of from 0.87 to 1.03 g/cm$^3$ and a viscosity at 170° C. of from 100 to 1500 mPas, from 1 to 10 parts by weight of an EVA copolymer having a melt index of from 0.2 to 440 dg/min, a VA proportion of from 11 to 42% and a Vicat softening temperature of from 36° to 80° C., from 0.01 to 0.05 parts by weight of an organic peroxide having a scorch temperature of greater than 100° C., from 0.01 to 0.05 parts by weight of an azo ester and from 1 to 10 parts by weight of an alcohol.

* * * * *